United States Patent Office 3,811,981
Patented May 21, 1974

3,811,981
PROCESS FOR GLUING PAPER
Andre Guillaume, Lyon, and Charles Schneider, Vernaison, France, assignors to Rhone-Poulenc S.A., Paris, France
No Drawing. Continuation of abandoned application Ser. No. 58,150, July 24, 1970. This application Apr. 5, 1972, Ser. No. 241,468
Claims priority, application France, July 28, 1969, 6925746
Int. Cl. C09j 3/14; B32b 27/10, 27/28
U.S. Cl. 156—332                                5 Claims

ABSTRACT OF THE DISCLOSURE

Paper is advantageously bonded by the melt adhesive technique with a terpolymer of a vinyl ester of a lower aliphatic acid, e.g. vinyl acetate, an unsaturated acid, e.g. crotonic acid, and a vinyl ester of a higher aliphatic acid.

This is a continuation of application Ser. No. 58,150, filed July 24, 1970 and now abandoned.

This invention relates to the gluing of paper with melt adhesives.

French Pat. No. 1,036,600 describes hot-melt adhesives for bookbinding. These compositions contain one part of a copolymer of vinyl acetate and crotonic acid and ½ to 2 parts of a liquifying softener such as a chlorinated diphenyl. These compositions can be dispersed in alkalis, which makes it possible to remove all traces of adhesive from waste paper arising from the trimming operations which accompany the bookbinding operations, and consequently to re-use these trimmings, especially for the manufacture of new papers.

The present invention provides a new process for gluing paper using a melt adhesive in which the melt adhesive comprises a terpolymer of:

(a) 40 to 90% of a vinyl ester of a saturated aliphatic monocarboxylic acid of 1 to 4 carbon atoms;
(b) 2 to 20% of an ethylenically unsaturated monoacid or polyacid of 3 to 6 carbon atoms, and
(c) 5 to 58% of a vinyl ester, or of a mixture of vinyl esters, of a saturated aliphatic monocarboxylic acid of 8 to 30 carbon atoms, the said percentages being based on the total weight of the monomers.

The first constituent of the terpolymer can be vinyl formate, vinyl acetate, vinyl propionate or vinyl butyrate. The proportion by weight of this ester in the terpolymer is preferably between 60 and 85%.

Examples of suitable ethylenically unsaturated monocarboxylic or polycarboxylic acids are acrylic, methacrylic, crotonic, maleic, fumaric, itaconic and aconitic acid. The proportion by weight of the unsaturated acid in the terpolymer is preferably between 5 and 10%.

The monocarboxylic acid having 8 to 30 carbon atoms, hereinafter called the higher alkanoic acid, from which the third constituent of the terpolymer is derived, can be linear or branched. It can be an acid of well defined formula, such as caprylic, pelargonic, capric, lauric, stearic or cerotic acid, or mixtures of acids, such as the mixture of acids sold under the trade name "Versatic 911" acids, which are mixtures of tertiary monocarboxylic acids (about 90%) and secondary monocarboxylic acids (about 10%) each having 9 to 11 carbon atoms per molecule. The preparation of such acids is described in Chemical Products and Aerosol News (March 1962, pages 119–120, 132).

The preparation of the vinyl esters of the various acids enumerated above is well-known. In the particular case of the vinyl esters of branched acids ("Versatic 911"), they can be prepared by the method described in French Pats. Nos. 1,330,158 (Example 1) and 1,330,746 (Example 2) or by reaction of the branched acids with vinyl acetate in the presence of a mercury salt (see French Pat. No. 1,350,937).

The proportion by weight of the vinyl esters of higher alkanoic acids is preferably 10 to 30%.

The terpolymers can be prepared by the customary techniques for the polymerization of vinyl monomers. Preferably, a bulk polymerization is carried out, using a peroxidic initiator and a chain stopper such as acetaldehyde. The reduced specific viscosity of the terpolymers, measured at 25° C. in a 0.5% solution in cyclohexanone is generally between 5 and 100 cm.³/g.; preferably, the said viscosity is between 15 and 50 cm.³/g.

It should be understood that while the terpolymer can be used by itself as an adhesive, it is also possible to mix it with various materials which can improve certain properties of the adhesive, for example mechanical properties or water impermeability, or which can reduce its melt viscosity. Such an adjuvant must of course be compatible with the fused polymer and must not change its good adhesion to paper and its dispersibility in alkalis.

Examples of adjuvants are liquefying softeners such as the chlorinated diphenyls, plasticizers such as the alkyl phthalates, paraffins, fillers and pigments, and the so-called "reinforcing" resins, the use of which is well-known in the field of compositions applied in the fused state. For example, up to 30% by weight of chlorinated diphenly relative to the terpolymer can be used. The term "paraffin" is used herein to mean linear chain hydrocarbons having 22 to 33 carbon atoms per molecule, which are obtained by distillation of petroleum which has already been refined by chemical treatment. Their melting point is generally between 34° C. and 70° C. For reasons of compatibility with the polymer, the proportion of paraffin generally does not represent more than 50% by the weight of the polymer.

Examples of "reinforcing" resins, of which the melting point is generally below 100° C. are esters of colophony, such as the glycerine esters of hydrogenated colophony, glycerine esters of polymerized colophonyl, para-toluene-sulphonamide-formaldehyde resins, phenol-formaldehyde resins, indene-coumarone resins, phenolic resins or terpene resins. These resins can themselves contain a plasticizer. The proportion of reinforcing resin can be as high as 95% of the weight of the mixture of polymer+resin.

The process of the invention can be carried out by the customary techniques of coating or gluing with compositions applied in the fused state. The apparatus generally consists of a heated vessel, in which the adhesive is kept fused, and a system which allows a certain amount of this adhesive to be deposited on the support.

The glue bonds produced with the aid of the adhesives of the invention are of excellent quality and can furthermore be dispersed in an alkaline medium. With these adhesives, it is superfluous to use adhesion primers.

In order to measure the strength of the glue bonds produced with the adhesives used in the invention, the following test is used: 30 sheets of paper, 0.25 mm. thick and 25 x 50 mm., are stacked. These sheets are firmly pressed together between two wooden boards each 25 x 45 mm. The edge of the stack of sheets is straightened with a fine file. The adhesive, heated to 190° C., is run over the edge. A wooden board P of the same thickness as the stack of sheets is applied to the glued edge and the whole is then placed in an oven for 2 minutes. The assembly is then left in an atmosphere of relative humidity 60, at 23° C., for 1 week. The sheets of paper are then torn off. To do so, the board P is fixed in one of the jaws of a tensiometer, each of the sheets of paper is successively fixed in the other jaw, and the jaws are separated (speed of travel 15 mm./minute) until the glue bond breaks. The breaking strength of the glue bond is measured. In the text which follows, the value of this strength, calculated as an average for the 30 sheets of paper, is given.

The examples which follow illustrate the invention.

EXAMPLE 1

In this example, the terpolymer originates from the copolymerization of vinyl acetate, crotonic acid and a product sold commercially under the trade name "Versatate Veova 911," which is a mixture of vinyl esters of $C_9$ to $C_{11}$ branched monocarboxylic acids, having the following characteristics:

| | |
|---|---|
| Average molecular weight | 197 |
| Viscosity at 20° C. _____cst_ _ | 2.2 |
| Refractive index $n^D{}_{20}$ | 1.439 |
| Acid number | 1 |
| Bromine number | 78–80 |
| Boiling point (100 mm. Hg) _____° C_ _ | 129–180 |

The polymer is prepared as follows. The following are introduced into a 2 litre reactor equipped with a stirrer, a thermometer, a condenser, a dropping funnel and a system which allows test samples to be taken:

| | G. |
|---|---|
| Vinyl acetate | 825 |
| Crotonic acid | 20 |
| "Versatate Veova 911" | 120 |
| 41% strength solution of acetaldehyde in vinyl acetate | 41 |
| Benzoyl peroxide containing 15.5% of moisture | 5.7 |

The following are introduced into the dropping funnel:

| | G. |
|---|---|
| Vinyl acetate | 195 |
| Crotonic acid | 40 |
| Acetaldehyde | [1] 27 |
| Benzoyl peroxide | 3.55 |

[1] Of the above solution.

This mixture introduced into the reactor is stirred (80 r.p.m.) and heated to the boil (68–72° C.) by means of a thermostatically controlled bath for 30 minutes. The addition of the material from the dropping funnel is then started and is carried out continuously for 6 hours 20 minutes. At the end of the addition, the temperature of the bath is raised to 90–92° C. for 1 hour and the stirring is slowed down (22 r.p.m.). 380 cm.$^3$ of acetone are added, with cooling of the mixture to 60° C.

After removing the acetone by heating under reduced pressure, a product which has the following characteristics is obtained:

| | |
|---|---|
| Reduced specific viscosity _____cm.$^3$/g_ _ | 18 |
| Free crotonic acid _____percent_ _ _ | 0.5 |
| Total acidity expressed as crotonic acid ____do____ | 5.9 |
| Unsaturation expressed as "Versatate Veova 911" ____do____ | 0.8 |
| Kraemer-Sarnow point _____° C_ _ _ | 71 |

The composition by weight of the terpolymer obtained is essentially:

| | |
|---|---|
| Vinyl acetate | 85 |
| Crotonic acid | 5 |
| "Versatate Veova 911" | 10 |

10 g. of the terpolymer obtained dissolve in 1 hour 30 minutes at ambient temperature, with stirring, in 90 g. of an aqueous solution containing 1.04 g. of ammonia of 22° Bé strength and in 90 g. of an aqueous solution containing 0.8 g. of sodium carbonate.

The terpolymer is subjected to the adhesive bond test described above. The average value of the tensile strength of the adhesive bond is 25 kg./cm.$^2$.

By way of comparison, the tensile strength value of an adhesive bond made under the conditions described above, using a vinyl acetate/crotonic acid copolymer containing 95% by weight of vinyl acetate is close to 0.

EXAMPLE 2

Compositions containing 100 parts of the terpolymer of Example 1 and respectively 5, 10 and 15 parts of a chlorinated diphenyl (containing 54% by weight of chlorine) are prepared.

Sheets of paper are bonded with these compositions in accordance with the technique described above.

The adhesive bond strength test gives the following results:

| | |
|---|---|
| With 5% of chlorinated diphenyl relative to the terpolymer _____kg./cm.$^2$_ _ | 42.5 |
| With 10% chlorinated diphenyl relative to the terpolymer _____kg./cm.$^2$_ _ | 73 |
| With 15% of chlorinated diphenyl relative to the terpolymer _____kg./cm.$^2$_ _ | 120 |

By way of comparison, compositions containing 100 parts of the vinyl acetate/crotonic acid copolymer described in Example 1 and respectively 5, 10 and 15 parts of chlorinated diphenyl yield adhesive bonds of which the strength is 7, 15 and 23 kg./cm.$^2$ respectively.

EXAMPLE 3

Following the procedure of Example 1, a terpolymer displaying the following characteristics is prepared:

| | |
|---|---|
| Composition by weight: | |
|   Vinyl acetate | 65 |
|   Crotonic acid | 5 |
|   "Versatate Veova 911" | 30 |
| Reduced specific viscosity _____cm.$^3$/g_ _ | 26 |
| Free crotonic acid _____percent_ _ | 0.2 |
| Total acidity _____do____ | 5.6 |
| Unsaturation _____do____ | 0.5 |
| Kraemer-Sarnow point _____° C_ _ | 69 |

This terpolymer displays the same characteristics of dispersibility in an alkaline medium as the terpolymer of Example 1.

Sheets of paper are bonded with the terpolymer and with compositions containing 100 parts of this terpolymer and respectively 5 and 10 parts of chlorinated diphenyl, and the strength of these adhesive bonds are then measured in accordance with the technique described above.

The following results are observed:

| | Kg./cm.$^2$ |
|---|---|
| With the polymer alone | 8 |
| With the polymer+5% of chlorinated diphenyl | 15 |
| With the polymer+10% of chlorinated diphenyl | 40 |

EXAMPLE 4

A terpolymer of vinyl acetate (65%), crotonic acid (5%) and vinyl stearate (30%) displaying the following characteristics is prepared as in Example 1:

| | |
|---|---|
| Reduced specific viscosity _____cm.$^3$/g_ _ | 29 |
| Free crotonic acid _____percent_ _ | 0.25 |
| Total acidity _____do____ | 5.5 |
| Unsaturation expressed as vinyl acetate ____do____ | 0.2 |
| Kraemer-Sarnow point _____° C_ _ | 59 |

This terpolymer shows the same properties of dispersibility in an alkaline medium as the terpolymers of Examples 1 and 3. An adhesive bond made with this terpolymer in accordance with the technique described above gives a tensile strength of 33 kg./cm.$^2$.

EXAMPLE 5

A terpolymer of vinyl acetate (65%), crotonic acid (5%) and vinyl laurate (30%) displaying the following characteristics is prepared as in Example 1:

| | |
|---|---|
| Reduced specific viscosity _____cm.$^3$/g_ _ | 35 |
| Free crotonic acid _____percent_ _ | 0.3 |
| Total acidity _____do____ | 5.2 |

Unsaturation (expressed as vinyl laurate) __percent__ 0.6
Kraemer-Sarnow point _____ °C__ 61

This terpolymer possesses the same characteristics of dispersibility in an alkaline medium and of bonding to paper as the terpolymers of the preceding examples.

We claim:
1. In a process for bonding paper to paper using a hot melt adhesive, the improvement wherein said adhesive consists essentially of a terpolymer of:
   (a) 40 to 90% of a vinyl ester of a saturated aliphatic monocarboxylic acid of 1 to 4 carbon atoms,
   (b) 2 to 20% of an ethylenically unsaturated monoacid or polyacid of from 3 to 6 carbon atoms, and
   (c) 5 to 58% of a vinyl ester, or of a mixture of vinyl esters, of a saturated aliphatic monocarboxylic acid having from 8 to 30 carbon atoms, the said percentages being based on the total weight of the monomers.
2. The improvement according to claim 1 in which the adhesive contains, in addition to the terpolymer, paraffin wax, a filler, a pigment or a chlorinated diphenyl.
3. The improvement according to claim 1 in which the adhesive also contains a reinforcing resin selected from the group consisting of esters of colophony, paratoluene sulphonamide-formaldehyde resins, phenol-formaldehyde resins, indene-coumarone resins, phenolic resins and terpene resins.
4. The improvement according to claim 1, in which the terpolymer is a terpolymer of:
   (a) 60 to 85% of the vinyl ester of a saturated aliphatic monocarboxylic acid having from 1 to 4 carbon atoms,
   (b) 5 to 10% of the ethylenically unsaturated monoacid or polyacid having from 3 to 6 carbon atoms, and
   (c) 10 to 30% of the vinyl ester or mixture of vinyl esters of a saturated aliphatic monocarboxylic acid having from 8 to 30 carbon atoms, the said percentages being based on the total weight of the monomers.
5. The improvement according to claim 1 in which the constituents of the terpolymer are:
   (a) vinyl acetate;
   (b) crotonic acid; and
   (c) a mixture of vinyl esters of secondary and tertiary saturated aliphatic carboxylic acids of 9 to 11 carbon atoms per molecule, vinyl laurate, or vinyl stearate.

References Cited
UNITED STATES PATENTS

| Patent No. | Date | Inventor | Class |
|---|---|---|---|
| 2,657,187 | 10/1953 | Evans et al. | 161—251 X |
| 3,477,871 | 11/1969 | Van Westrenan | 117—155 |
| 3,484,338 | 12/1969 | Britton et al. | 161—216 |
| 3,579,629 | 5/1971 | Pasero et al. | 424—47 |
| 3,639,320 | 2/1972 | Faure et al. | 260—28.5 |
| 3,697,618 | 10/1972 | Grunewalder et al. | 260—78.5 |

ALFRED L. LEAVITT, Primary Examiner

R. A. DAWSON, Assistant Examiner

U.S. Cl. X.R.

117—155 UA, 161 UT; 156—334, 335; 161—235, 246, 251, 263; 260—23 AR, 23 CP, 80.8, 80.81